Patented May 8, 1951

2,551,641

UNITED STATES PATENT OFFICE 2,551,641

PROCESS OF REACTING ALPHA-MONO OLEFINS WITH CONJUGATED HYDROCARBONS AND ORGANIC PEROXIDES, AND PRODUCTS PRODUCED THEREBY

Francis M. Seger, Pitman, William E. Garwood, Haddonfield, and Alexander N. Sachanen, Woodbury, N. J., assignors to Socony-Vacuum Oil Company, Incorporated, a corporation of New York No Drawing. Application October 7, 1948, Serial No. 53,372

11 Claims. (Cl. 260—666)

This invention has to do with the condensation of normal, alpha mono-olefins, certain conjugated hydrocarbons and organic peroxides, and particularly has to do with the new and useful compositions obtained by said condensation.

It is well known to those familiar with the art that ethylene and conjugated diolefinic hydrocarbons, such as butadiene, are readily polymerized in the presence of peroxides or oxygen. This has been embodied in numerous processes which are of considerable commercial importance in the production of high molecular weight plastics and elastomers. In contrast to the polymers formed by the polymerization of ethylene or of conjugated diolefinic hydrocarbons in the presence of acidic polymerization catalysts, the products obtained when peroxides or oxygen are utilized as polymerization catalysts are predominantly high molecular weight polymers. In no known instance, however, have normal alpha mono-olefins been condensed with conjugated hydrocarbons and organic peroxides.

It has now been discovered that normal, alpha mono-olefins condense with certain conjugated hydrocarbons and organic peroxides, under conditions hereinafter defined, with the formation of highly desirable viscous oils. The oils so formed are characterized by high viscosity index (V. I.) and low pour point.

Reactants

As indicated above, the mono-olefin reactants of this invention are normal or straight chain alpha mono-olefins and contain from 5 to 18 carbon atoms. Such mono-olefins are normally liquid at temperatures of the order of 20–25° C. Illustrative of such mono-olefins are the following: pentene-1, octene-1, decene-1, dodecene-1, octadecene-1, and the like. Preferred, however, of such olefins are those having from 8 to 12 carbon atoms, with decene-1 representing a particularly desirable olefin. It will be clear from the foregoing examples that an alpha olefin may also be referred to as a 1-olefin.

Not only may the mono-olefins of the aforesaid character be used individually in this invention, but they may also be used in admixture with each other. In addition, olefin mixtures containing a substantial proportion of such mono-olefins may be used. Preferred of such mixtures are those containing a major proportion of a 1-olefin or of 1-olefins. Representative of such mixtures are those obtained by the cracking of paraffin waxes and other paraffin products; those obtained from the Fischer-Tropsch and related processes.

These hydrocarbon mixtures may contain, in addition to the 1-olefin or 1-olefins, such materials as: other olefins, paraffins, naphthenes and aromatics.

The conjugated reactants contemplated herein are conjugated hydrocarbons and derivatives thereof, wherein the conjugated system is represented by the grouping:

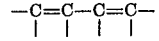

Of such conjugated hydrocarbons, butadiene and styrene have been found to be particularly desirable for the purposes of this invention. These conjugated hydrocarbons are characterized by at least one vinyl group,

in a 1:3 conjugated relationship with another double bond. Further examples of such conjugated hydrocarbons are: isoprene (2-methyl butadiene), 1-phenyl butadiene, divinyl benzene, vinyl naphthalene, and the like. Inasmuch as other conjugated hydrocarbons form polymeric materials, as illustrated by cyclopentadiene, methyl isoprene, methyl styrene, and the like, such hydrocarbons may also be used to form satisfactory products when condensed with the aforesaid 1-mono-olefins and organic peroxides. It will be noted that all of the foregoing conjugated materials are hydrocarbons.

Derivatives of the conjugated hydrocarbons, or substituted conjugated hydrocarbons, which typify those contemplated herein are: halogen-substituted material such as chloroprene (2-chlorobutadiene), 1-bromo butadiene and p-chlorostyrene; alkoxy-substituted materials such as p-methoxy styrene; etc. As will be noted from the character of the foregoing typical substituted conjugated hydrocarbons, substituent groups which may be present are those which do not interfere with the course of the condensation of the conjugated system with the aforesaid 1-monoolefin and organic peroxide. In other words a substituent group which may be present on the conjugated hydrocarbon is one which is substantially inert or unreactive in the condensation. The substituent group, however, generally modifies the character of the oil product. For example, when chloroprene or p-chloro styrene is used, the synthetic lubricant formed is also characterized by extreme pressure properties.

In connection with divinyl benzene, which may be used as a conjugated reactant, it should be noted that this reactant is characterized by a high degree of reactivity in view of the two vinyl groups. For most satisfactory results with divinyl benzene, a relatively small quantity should be used with a 1-mono-olefin and an organic peroxide. Accordingly, in the discussion of reaction proportions hereinafter, it should be recognized that the quantity of divinyl benzene used will generally be at the lower end of the conjugated reactant proportion range.

It will be understood, of course, that mixtures of the aforesaid conjugated hydrocarbons, and their aforesaid derivatives, may be used in place of the individual reactant. Similarly, mixtures containing substantial, and preferably major, proportions of one or more of said conjugated reactants may be used. Examples of such mixtures are: a crude styrene containing ethyl benzene, a crude butadiene containing butenes, and coal tar light oils which contain dicyclopentadiene, indene, coumarone, and aromatics.

As will be evident from the foregoing discussion of the conjugated reactant, benzene is not considered herein as a conjugated hydrocarbon, despite its alternate double bond character. In contrast with benzene, the conjugated reactants, as aforesaid, are characterized by at least one vinyl group,

in a 1:3 conjugated relationship with another double bond.

Preferred of the conjugated reactants are those having only one conjugated grouping

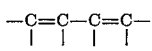

with particular preference being given to styrene and butadiene.

In general, any organic peroxide is suitable for our purpose. By organic peroxide we mean those organic compounds which contain a —O—O— linkage. In this connection, it must be clearly understood that when we speak of organic peroxides herein and in the claims we have reference to organic hydroperoxides as well as simple organic peroxides. The organic peroxides utilizable in the process of the present invention may be aliphatic peroxides, aromatic peroxides, heterocyclic peroxides and alicyclic peroxides. Diethyl peroxide, tertiary butyl hydroperoxide, benzoyl peroxide, dimethylthienyl peroxide, cyclohexyl peroxide, and lauroyl peroxide may be mentioned by way of non-limiting examples of organic peroxides suitable for the process of our invention. In general, we prefer to use those organic peroxides containing the radical

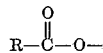

wherein R is an aliphatic or aromatic radical, such as acetyl peroxide, and of these, we especially prefer to use those containing a benzene ring, such as benzoyl peroxide. The organic peroxides may be derived from any suitable source as is well understood and, advantageously, may be be formed in situ, thereby obviating the necessity of using the relatively expensive commercial organic peroxides. Such a modification must be considered to be within the scope of the present invention, although the use of individual organic peroxides is preferred.

The formation of the organic peroxides in situ may be accomplished in a number of ways. For example, they may be formed in accordance with the procedure of Price and Krebs [Organic Syntheses, 23, 65 (1943)], or by contacting oxygen or air, preferably moist air, with a suitable organic compound such as a hydrocarbon, or an ether, which reacts therewith to form the desired organic peroxide. Ethyl benzene, cyclohexene, and tetralin which readily form peroxides on oxidation, may be mentioned by way of non-limiting examples of organic compounds utilizable for forming the organic peroxides in situ.

In general, and in accordance with our invention, the amounts of organic peroxide to be used are relatively large. In contrast to the polymerization reactions of the prior art which involve conjugated diolefinic hydrocarbons or ethylene wherein organic peroxides function exclusively as catalysts in the widely accepted sense of the term, we have found that in our process, the decomposition products of organic peroxides combine with the 1-normal, alpha mono-olefins and conjugated hydrocarbons. Accordingly, the yields and nature of the products obtained in the process of the present invention depend upon the amount of and reflect the type of organic peroxides employed. For instance, when benzoyl peroxide is reacted with a normal, alpha mono-olefin and a conjugated hydrocarbon in accordance with our process, products containing benzene rings and other structural fragments of the benzoyl peroxide will be formed. Viewed in this light, our process is one involving both polymerization and the broader and more comprehensive reaction-condensation.

Hence, in our process the amounts of organic peroxides employed determine the yield and quantity of product. Good results may be obtained using from about 0.02 to about 0.20 molar proportion of a peroxide, with between about 0.01 and about 1.00 molar proportion of conjugated hydrocarbon, and with one molar proportion of a normal alpha mono-olefin. Preferably, however, we employ organic peroxides in amounts varying between about 0.05 and about 0.10 molar proportion, with between about 0.03 and about 0.50 molar proportion of conjugated hydrocarbon, and with one molar proportion of mono-olefin. In all cases, the quantity of peroxide used is a reactive quantity as distinguished from merely a catalytic quantity, for the peroxide reactant enters into the condensation and fragments thereof form components of the condensation products.

In carrying out the process of the present invention, the organic peroxide is added to the mono-olefin and conjugated hydrocarbon, preferably in two or more portions at intervals of a few hours. If desired, the organic peroxide may sometimes be added in a single addition, although excessive heat of reaction may be encountered.

When the organic peroxide is formed in situ, a mixture of the mono-olefin and conjugated hydrocarbon, and an organic compound which forms an organic peroxide when subjected to oxidation, in amounts of at least about 5%, preferably at least about 20%, based on the weight of the monoolefinic hydrocarbon reactant, is contacted with oxygen (air for example) under the conditions of reaction to produce the organic peroxide in situ at the same time that the condensation reaction occurs. The contact with oxygen may be effected by agitation of the mixture in air, bubbling of the air through the mixture, etc. In another embodiment of this modification, an organic compound is peroxidized to a desired degree before the addition of the mono-olefin and conjugated hydrocarbon. Yet another modification is to use the mono-olefinic hydrocarbon reactant per se for oxidation to the peroxide, with simultaneous or subsequent reaction to bring about the condensation of unreacted mono-olefin with that portion which has been converted to peroxide.

In accordance with the process of the present invention and depending upon the conditions of operation and the nature of the mono-olefinic hydrocarbon reactants, various condensation products, from comparatively low-boiling to high-boiling fractions, can be synthesized. Thus, in our process, it is possible to produce fractions boiling within the range of those of lubricating oils, i. e., above 700° F. These products are of particular interest and importance. For example, synthetic lubricating oils obtained in accordance with our process generally have high viscosity indices, of the order of 100 or more, and the pour points are low. In contrast to synthetic lubricating oils obtained in the processes of the prior art involving solely the polymerization of olefinic hydrocarbons, those of the present invention contain not only paraffinic chains but also other structural elements, depending upon the organic peroxide used, for example, aromatic rings, which may affect the properties, particularly the stability, of the synthetic lubricating oils produced. Further, the synthetic lubricating oils synthesized by the alkylation of aromatics with olefinic hydrocarbons or chlorinated alkanes will differ materially from those of our invention due to the very nature of the reactions involved. Thus, as is well known, the processes involving alkylation reactions utilize strong catalysts which induce a series of side reactions, such as cracking, isomerization, etc. On the other hand, in our process, the reaction is affected under conditions whereby side reactions, if any, are kept to a minimum, and the temperature conditions are comparatively mild. Accordingly, the utilization of our process for the manufacture of synthetic lubricating oils must be considered a preferred, but nevertheless non-limiting embodiment of our invention.

Reaction conditions

In carrying our condensation of the aforesaid reactants, temperatures varying between about 120° F. and about 400° F. are generally used, depending primarily, however, upon the kind of organic peroxide employed. Thus, when benzoyl peroxide is used, the temperature may vary between about 120° F. and about 300° F. and, preferably, between about 175° F. and about 210° F. When hydroperoxides are used, however, the temperature may vary between about 210° F. and about 400° F., and is preferably of the order of 350° F. The pressure to be employed depends upon the temperature used and, ordinarily, a pressure sufficient to maintain the reactants in substantially a liquid phase at the temperature employed is adequate. The time of reaction depends upon the temperature, the nature of the reactants employed, the quantity of reactants, and to a certain extent upon the pressure. In general, the higher the temperature employed the shorter the reaction time required, the criterion used being the time required at a given reaction temperature to effect condensation and, more specifically, to assure substantially complete consumption of the organic peroxide. For example, in batch operation, we have found that at a temperature of 185° F., the time of reaction is preferably over 5 hours.

Proportions of reactants used are described above and are further referred to below in connection with several illustrative examples.

The process may be carried out as a batch, continuous, or semi-continuous type of operation. Particularly when the process is carried out on a commercial scale, economic considerations make it preferable to operate in a continuous manner. For efficient operation, where the process is carried out on a batch or continuous basis, it is essential that the mono-olefin and conjugated hydrocarbon reactants be intimately contacted with the organic peroxide. This may be effected in several ways and in apparatus which are well known in the art.

Examples

In order to illustrate the principles of this invention, the results of a series of typical, and non-limiting, condensations are set forth in tabular form in the table below. The condensations were carried out by reacting a 1-olefin, conjugated hydrocarbon and peroxide, under the conditions indicated in the table. The condensation products obtained were distilled under vacuum and oily residues were recovered. To distinguish the condensation products from the distillate fractions thereof, the refined oils are identified as "residual oils." The latter term identifies the oils from which unreacted materials and products of intermediate boiling range have been separated.

All of the tests and analyses to which the residual oils in the table were subjected are well known standard tests. In this connection, it will be noted that the designation "N. N." refers to the neutralization number, which is a measure of the acidity of the oil; and the designation "SAE No." refers to the SAE viscosity number of the oil.

Styrene used in these condensations contained a fraction of one per cent of p-tertiary-butyl catechol, the latter acting as a stabilizer or polymerization inhibitor. This styrene material is the commercial product now available.

Table

| Run No. | 1 | 2 | 3 | 4 | 5 | 6 |
|---|---|---|---|---|---|---|
| Mono-olefin | Octene-1 | Octene-1 | Decene-1 | Decene-1 | Decene-1 | Decene-1. |
| Parts by Weight | 224 | 224 | 280 | 280 | 280 | 280 |
| Molar Proportion | 2.0 | 2.0 | 2.0 | 2.0 | 2.0 | 2.0 |
| Conjugated System | Styrene | Styrene | Styrene | Styrene | Styrene | Styrene. |
| Parts by Weight | 10.4 | 29 | 7 | 26 | 52 | 104 |
| Molar Proportion | 0.1 | 0.28 | 0.063 | 0.25 | 0.5 | 1.0 |
| Peroxide | Benzoyl | Benzoyl | Benzoyl | Benzoyl | Benzoyl | Benzoyl. |
| Parts by Weight | 2 | 48 | 24 | 48 | 48 | 48 |
| Molar Proportion | 0.008 | 0.2 | 0.1 | 0.2 | 0.2 | 0.2 |
| Temperature, °F | 188 | 187 | 185 | 194 | 188 | 188 |
| Time, Hours | 5 | 10¼ | 10½ | 10½ | 10 | 9½ |
| Residual Oils: | | | | | | |
| Parts by Weight | 30 | 84 | 68 [2] | 134 [3] | 140 [3] | 194 |
| Per Cent Yield [1] | 12.7 | 27.9 | 21.9 | 37.9 | 36.8 | 45 |
| K. V. @ 100° F., cs | 17.20 | 671 | 107.1 | 266.6 | | |
| K. V. @ 210° F., cs | 2.97 | 26.50 | 11.32 | 18.45 | | |
| V. I. | <0 | 46.4 | 99.9 | 82.1 | | |
| SAE No. | <10 | 70 | 30 | 50 | | Hard Wax. |
| Pour Point, °F | | −10 | −60 | −25 | +35 | |
| Br. Addn. No. | 10.8 | | 9.1 | 7.2 | 2.8 | |
| Refractive Index | 1.4790 | | 1.4963 | 1.5090 | | |
| Specific Gravity | 0.8990 | 0.9738 | 0.9194 | 0.9446 | 0.9792 | |
| N. N. | | 1.8 | 1.7 | 4.8 | 1.63 | |

| Run No. | 7 | 8 | 9 | 10 | 11 |
|---|---|---|---|---|---|
| Mono-olefin | Decene-1 | Octene-1 | Octene-2 | 2-Ethyl Hexene-1 | 2-Ethyl Hexene-1. |
| Parts by Weight | 280 | 224 | 224 | 224 | 224 |
| Molar Proportion | 2.0 | 2.0 | 2.0 | 2.0 | 2.0 |
| Conjugated System | Butadiene | Styrene | Styrene | Styrene | Styrene. |
| Parts by Weight | 61 | 29 | 26 | 26 | 104 |
| Molar Proportion | 1.1 | 0.28 | 0.25 | 0.25 | 1.0 |
| Peroxide | Benzoyl | Benzoyl | Benzoyl | Benzoyl | Benzoyl. |
| Parts by Weight | 48 | 48 | 48 | 48 | 48 |
| Molar Proportion | 0.2 | 0.2 | 0.2 | 0.2 | 0.2 |
| Temperature, °F | 250 | 187 | 185 | 185 | 180 |
| Time, Hours | 10½ | 10¼ | 10 | 10 | 10 |
| Residual Oils: | | | | | |
| Parts by Weight | 41 | 84 | 90 | 82 | 154 |
| Per Cent Yield [1] | 10.5 | 27.9 | 30.2 | 27.5 | |
| K. V. @ 100° F., cs | 1,378 | 671 | 512 | 1,484.0 | |
| K. V. @ 210° F., cs | 82.1 | 26.50 | 19.86 | 25.38 | |
| V. I. | 116 [4] | 46.4 | 12 | <0 | |
| SAE No. | 250 | 70 | | | Brittle Resin. |
| Pour Point, °F | 0 | −10 | −10 | +25 | |
| Br. Addn. No. | 40.3 | | 17.2 | 18.4 | |
| Refractive Index | | | | | |
| Specific Gravity | | 0.9738 | 0.9813 | 1.0111 | |
| N. N. | 7.3 | 1.8 | 12.8 | 0.3 | |

[1] Percentage by weight of combined reactants.
[2] Reaction product was shaken with 90 parts by weight of 10% aqueous NaOH, and 5 ccs. of glacial acetic acid were added to the raffinate (of NaOH treatment), prior to distillation.
[3] Reaction product shaken with 175–300 parts by weight of 10% aqueous NaOH, and 3–7 ccs. of glacial acetic acid were added to the raffinate (of NaOH treatment), prior to distillation.
[4] Calculated value.

In the table above, run No. 1 demonstrates that the quantity of peroxide used was inadequate, for the residual oil obtained had a viscosity index of less than 0 and the yield thereof was only 12.7 per cent. In contrast, run No. 2 with the same reactants provides a residual oil having a viscosity index of 46.4 and a pour point of −10° F.; the yield of residual oil is 27.9 per cent, as opposed to only 12.7 per cent in run No. 1. Runs Nos. 3 through 6 indicate the type of products which may be prepared from decene-1, styrene and benzoyl peroxide by selecting suitable proportions thereof. In runs Nos. 3 and 4 excellent synthetic lubricants are obtained, the viscosity indices and pour points being, respectively, 99.9 and 82.1, and −60° F. and −25° F. The residual oil of run No. 5 has a pour point of +35° F. and is very viscous. It may be used as a thickening agent. The residual oil in run No. 6 is in the form of a hard wax, resembling carnauba wax in physical characteristics.

It will be noted, in connection with runs 2 through 6, that products of different characteristics may be obtained by selecting certain proportions of reactants with the range recited above. When relatively small amounts of a conjugated hydrocarbon are used, lubricating oils are formed, as illustrated by runs 2, 3 and 4. Correspondingly, with larger amounts of conjugated hydrocarbon, as illustrated by run 6, waxes are formed. Further, the residual oil of run 2 has a viscosity corresponding to an SAE 70 oil, whereas the SAE values of the residual oils of runs 3 and 4 are 30 and 50 respectively.

Run No. 7 illustrates a synthetic oil obtained from butadiene; this oil is excellently suited for use as a gear lubricant.

Runs Nos. 8 through 11 demonstrate the critical nature of the mono-olefin reactant. In run No. 8, octene-1 is used, whereupon a desirable synthetic lubricant is obtained. In contrast, oils of substantially lower viscosity index are obtained, in runs Nos. 9 and 10, when octene-2 and 2-ethyl hexene-1 are used. The oil obtained from octene-2 suffers also from a relatively high degree of acidity, with an N. N. of 12.8. In run No. 11, 2-ethyl hexene-1 and a relatively large quantity of styrene, reacted with benzoyl peroxide, form a brittle resin rather than a desired synthetic lubricant or wax.

When benzoyl peroxide is replaced by other typical peroxides or hydroperoxides, as in runs 2–8 of the table above, the residual oils obtained therewith will be similar in nature, though characterized by some distinguishing features. For example, residual oils of considerably higher V. I. and somewhat higher pour point will be formed when lauroyl peroxide or tertiary-butyl hydroperoxide is substituted for benzoyl peroxide.

As will be evident from the data presented above in the table, the condensation products of this invention are highly desirable lubricants per se. They are also of considerable value as blending agents for other lubricating oils. They impart desirable viscosity index (V. I.) and pour point characteristics to the oils in combination therewith, for, as indicated above, they have advantageous viscosity and pour point properties. In short, the synthetic oils find utility in "upgrading" other lubricants. Typical oils with which the synthetic oils may be blended are mineral oils such as are normally used in internal combustion and turbine engines. When so blended, the synthetic oils may comprise the major proportion of the final blended oil, or may even comprise a minor proportion thereof.

One or more of the individual properties of the synthetic lubricants of this invention may be further improved by incorporating therewith a small, but effective amount, of an addition agent such as an antioxidant, a detergent, an extreme pressure agent, a foam suppressor, a viscosity index (V. I.) improver, etc. Antioxidants for viscous oils are well known in the art, and generally contain sulfur, nitrogen, oxygen and/or phosphorus. Representative of such antioxidants is a phosphorus-and-sulfur containing reaction product of pinene and $P_2S_5$. Typical detergents which may be so used are metal salts of alkyl-substituted aromatic sulfonic or carboxylic acids, as illustrated by diwax benzene barium sulfonate and barium phenate, barium carboxylate of a wax-substituted phenol carboxylic acid. Extreme pressure agents are well known; illustrating such materials are numerous chlorine and/or sulfur containing compositions, one such material being a chlor-naphtha xanthate. Silicones, such as dimethyl silicone, may be used to illustrate foam suppressing compositions. Viscosity index improving agents which may be used are typified by polypropylenes, polyisobutylenes, polyacrylate esters, and the like.

Contemplated also as within the scope of this invention is a method of lubricating relatively moving surfaces by maintaining therebetween a film consisting of any of the aforesaid oils.

It is to be understood that the foregoing description and representative examples are non-limiting and serve to illustrate the invention, which is to be broadly construed in the light of the language of the appended claims.

We claim:

1. The process for effecting the condensation of a normal, alpha mono-olefin having from 5 to 18 carbon atoms, a conjugated hydrocarbon and an organic peroxide, which comprises: heating a charge consisting essentially of said mono-olefin, conjugated hydrocarbon and peroxide at a temperature between about 120° F. and about 400° F. for a period of time sufficient to effect condensation, one molar proportion of said mono-olefin being so condensed with between about 0.01 and about one molar proportion of said conjugated hydrocarbon and with between about 0.02 and about 0.20 molar proportion of said peroxide; said conjugated hydrocarbon being characterized by at least one

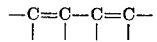

grouping and being selected from the group consisting of conjugated hydrocarbons and substituted conjugated hydrocarbons wherein a substituent is selected from the group consisting of halogen and alkoxy.

2. The process for effecting the condensation of a normal, alpha mono-olefin having from 5 to 18 carbon atoms, a conjugated hydrocarbon and an organic peroxide, which comprises: heating a charge consisting essentially of said mono-olefin, conjugated hydrocarbon and peroxide at a temperature between about 120° F. and about 400° F. for a period of time sufficient to effect condensation, one molar proportion of said mono-olefin being so condensed with between about 0.01 and about one molar proportion of said conjugated hydrocarbon and with between about 0.02 and about 0.20 molar proportion of said peroxide; said conjugated hydrocarbon being characterized by at least one

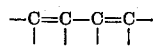

grouping.

3. The method of preparation of a synthetic oil of lubricating viscosity, which comprises: heating, at a temperature between about 120° F. and about 400° F. for a period of time sufficient to effect condensation, a charge consisting essentially of one molar proportion of a normal, alpha mono-olefin having from 8 to 12 carbon atoms, between about 0.03 and about 0.50 molar proportion of a conjugated hydrocarbon, and between about 0.05 and about 0.10 molar proportion of an organic peroxide, said conjugated hydrocarbon being characterized by at least one

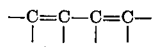

grouping, and separating from the condensation product thus formed said synthetic lubricating oil.

4. The method of preparation of a synthetic oil of lubricating viscosity, which comprises: heating, at a temperature between about 120° F. and about 300° F. for a period of time sufficient to effect condensation, a charge consisting essentially of one molar proportion of a normal, alpha mono-olefin having from 8 to 12 carbon atoms, between about 0.03 and about 0.50 molar proportion of a conjugated hydrocarbon, and between about 0.05 and about 0.10 molar proportion of an organic peroxide containing the benzene ring, said conjugated hydrocarbon being characterized by at least one

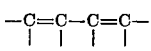

grouping, and separating from the condensation product thus formed said synthetic lubricating oil.

5. A new composition of matter comprising, a condensation product obtained by: heating, at a temperature between about 120° F. and about 400° F. for a period of time sufficient to effect condensation, a charge consisting essentially of a normal, alpha mono-olefin having from 5 to 18 carbon atoms, between about 0.01 and about 1.0 molar proportion of a conjugated hydrocarbon and between about 0.02 and about 0.2 molar proportion of an organic peroxide; said conjugated hydrocarbon being characterized by at least one

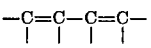

grouping and being selected from the group consisting of conjugated hydrocarbons and substituted conjugated hydrocarbons wherein a substituent is selected from the group consisting of halogen and alkoxy.

6. A new composition of matter comprising, a condensation product obtained by: heating, at a temperature between about 120° F. and about 400° F. for a period of time sufficient to effect condensation, a charge consisting essentially of a normal, alpha mono-olefin having from 5 to 18 carbon atoms, between about 0.01 and about 1.0 molar proportion of a conjugated hydrocarbon and between about 0.02 and about 0.2 molar proportion of an organic peroxide; said conjugated hydrocarbon being characterized by at least one

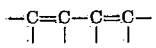

grouping.

7. A synthetic lubricating oil obtained by: condensing, at a temperature between about 120° F. and about 400° F. for a period of time sufficient to effect condensation, a charge consisting essentially of one molar proportion of a normal, alpha mono-olefin having from 8 to 12 carbon atoms, between about 0.03 and about 0.5 molar proportion of a conjugated hydrocarbon, and between about 0.05 and about 0.1 molar proportion of an organic peroxide, said conjugated hydrocarbon being characterized by at least one

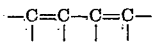

grouping, and separating from the condensation product thus formed said synthetic lubricating oil.

8. A synthetic lubricating oil obtained by: condensing, at a temperature between about 120° F. and about 300° F. for a period of time sufficient to effect condensation, a charge consisting essentially of one molar proportion of a normal, alpha mono-olefin having from 8 to 12 carbon atoms, between about 0.03 and about 0.5 molar proportion of a conjugated hydrocarbon, and between about 0.05 and about 0.1 molar proportion of an organic peroxide containing the benzene ring, said conjugated hydrocarbon being characterized by at least one

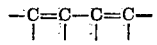

grouping, and separating from the condensation product thus formed said synthetic lubricating oil.

9. A synthetic lubricating oil obtained by: condensing, at about 185° F. for about ten hours, a charge consisting essentially of one molar proportion of decene-1, about 0.03 molar proportion of styrene and about 0.05 molar proportion of benzoyl peroxide, and separating from the condensation product thus formed said synthetic lubricating oil.

10. A synthetic lubricating oil obtained by: condensing, at about 195° F. for about ten hours, a charge consisting essentially of one molar proportion of decene-1, about 0.12 molar proportion of styrene and about 0.1 molar proportion of benzoyl peroxide, and separating from the condensation product thus formed said synthetic lubricating oil.

11. A synthetic lubricating oil obtained by: condensing, at about 250° F. for about ten hours, a charge consisting essentially of one molar proportion of decene-1, about 0.55 molar proportion of butadiene and about 0.1 molar proportion of benzoyl peroxide, and separating from the condensation product thus formed said synthetic lubricating oil.

FRANCIS M. SEGER.
WILLIAM E. GARWOOD.
ALEXANDER N. SACHANEN.

REFERENCES CITED

The following references are of record in the file of this patent:

UNITED STATES PATENTS

| Number | Name | Date |
|---|---|---|
| 2,142,980 | Huijser et al. | Jan. 3, 1939 |
| 2,301,668 | Pier et al. | Nov. 10, 1942 |
| 2,327,705 | Frohlich et al. | Aug. 24, 1943 |
| 2,440,800 | Hanford et al. | May 4, 1948 |